United States Patent [19]

Masuzawa et al.

[11] Patent Number: 4,642,736
[45] Date of Patent: Feb. 10, 1987

[54] LIGHT DIFFUSER

[75] Inventors: Tokihiko Masuzawa, Kani; Yoshitaka Kageyama; Norizou Tomita, both of Nagoya, all of Japan

[73] Assignee: Mitsubishi Rayon Company, Ltd., Tokyo, Japan

[21] Appl. No.: 724,275

[22] Filed: Apr. 17, 1985

[30] Foreign Application Priority Data

Jul. 2, 1984 [JP] Japan .................................. 59-136691
Oct. 29, 1984 [JP] Japan .................................. 59-227537

[51] Int. Cl.$^4$ .............................................. F21V 7/04
[52] U.S. Cl. .......................................... 362/31; 362/328
[58] Field of Search ............... 362/327, 328, 329, 331, 362/31

[56] References Cited

U.S. PATENT DOCUMENTS

| 2,247,969 | 7/1941 | Stewart ................... | 362/31 |
| 2,347,665 | 5/1944 | Christensen et al. ......... | 362/31 |
| 2,480,178 | 8/1949 | Zinberg ................... | 362/31 |
| 3,242,328 | 3/1966 | Kapany et al. ............. | 362/31 |
| 3,384,986 | 5/1968 | Davis . | |
| 3,752,974 | 8/1973 | Baker et al. .............. | 362/31 |

FOREIGN PATENT DOCUMENTS

| 746652 | 6/1933 | France . | |
| 475508 | 8/1969 | Switzerland ............. | 362/327 |
| 1130601 | 10/1968 | United Kingdom . | |

Primary Examiner—Randall L. Green
Attorney, Agent, or Firm—Oblon, Fisher, Spivak, McClelland & Maier

[57] ABSTRACT

An edge-lighting type light diffuser is disclosed which has a plane of light incidence, a light transmitting means and a plane of light emission. The light transmitting means is composed of a laminate of a plurality of light-transmissible plates. This structure provides a light diffuser capable of uniform plane illumination usable for sign boards, large-sized display devices, display devices for various types of machinery, and liquid crystal devices.

14 Claims, 15 Drawing Figures

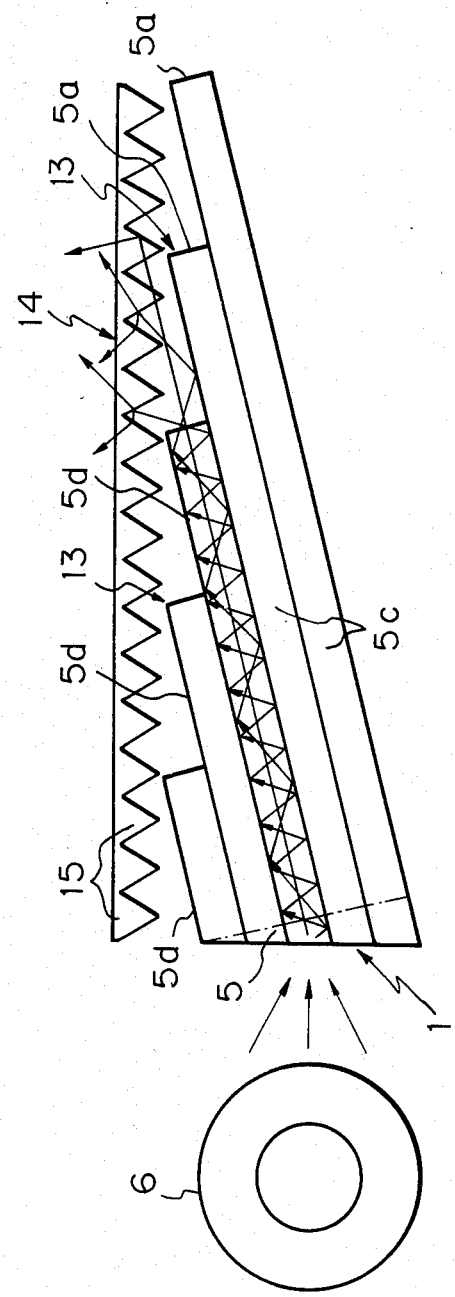

LIGHT DIFFUSER

BACKGROUND OF THE INVENTION

1. Field of the Invention

The present invention relates to a light diffuser most suitable for use as a plane lighting device. More particularly, the present invention relates to an edge lighting type light diffuser useful as a plane lighting device.

2. Description of the Related Art

Conventionally, large-sized plane lighting units are used as signboard and other various large display devices, and small-sized plane lighting units are used as display devices for various types of machinery and apparatus, and for liquid crystal watches. In signboards and large-sized display devices, a plane to be illuminated is generally illuminated by a plurality of line light sources, for example, fluorescent lighting, or point light sources, e.g., incandescent lamps, which are located behind a light diffusing plate. However, to obtain a plane illumination having a uniform brightness with such plane lighting units, the light diffusing plate and the light source must be spaced quite far apart, or a plurality of light sources must be located in close contact with each other. This requirement necessarily results in an enlargement in the size of the plane lighting unit or an increase in the number of light sources, with the results that the plane lighting unit not only becomes costly but there is also a significant increase in the power consumption.

In an attempt to overcome these deficiencies, some plane lighting units use a single transparent light conducting plate through which light is conducted from one side, thereby obtaining plane illumination. Where such a transparent light conducting plate is used, if the incident light rays from the light source are parallel, it is possible to obtain plane illumination having a substantially uniform brightness. However, since the light from the light source is practically diffused in a radial manner, the quantity of light emitted from the transparent light conducting plate is very bright in the vicinity of the light source and relatively dark at a location remote from the light source. Thus, in the prior art, it has been difficult to obtain uniform plane illumination.

OBJECTS OF THE INVENTION

Accordingly, one object of the present invention is to provide a novel light diffuser capable of providing uniform plane illumination which is also easy to manufacture.

Another object of the present invention is to provide a light diffuser in the form of a plane usable for signboards, large-sized display devices, display devices for various types of machinery and apparatus, and liquid crystal devices, and the like.

SUMMARY OF THE INVENTION

The objects of the present invention are attained by a light diffuser system which uses a plurality of light-transmitting plates in an edge lighting type light diffuser. The system utilizes a light incidence plane, a light transmitting structure, and a light emission plane.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 is a cross-sectional view of another embodiment of a light diffuser of the present invention;

DESCRIPTION OF THE PREFERRED EMBODIMENTS

Figure 1:
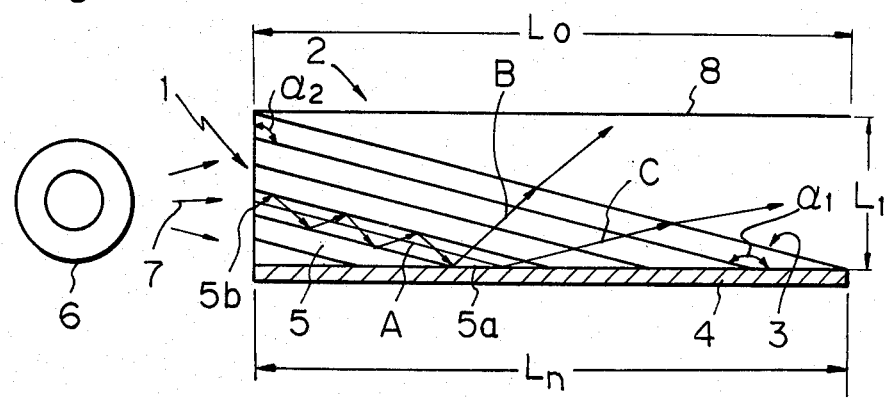
FIG. 1 is a cross-sectional view of one embodiment of a light diffuser of the present invention.

Referring now to the drawings, wherein like reference numerals designate identical or corresponding parts throughout the several views, and more particularly to FIGS. 1–8 thereof, reference numeral 1 represents a plane of incidence of light; reference numeral 2, a plane of emission of light; reference numeral 3, a light transmitter; reference numeral 4, a reflector; reference numeral 5, a transparent plate; reference numeral 6, a light source; reference numeral 7, incident light; reference numeral 8, a plane to be illuminated; reference numeral 9, a light scattering reflector; reference numeral 10, a light diffusing plate; reference numeral 11, a case; reference numeral 12, a lens; reference numeral 13, a step; and reference numeral 14, a light diffusing plate having a prism 15.

In the light diffuser shown in FIG. 1, the light transmitter 3 includes the plane of light incidence 1 and the plane of light emission 2, and is composed of a laminate of a plurality of thin transparent plates 5. The light reflector 4 composed of, for example, an aluminum-vapor-deposited polyester film having a thickness of 100μ and a mirror surface is provided at the edges 5a of the plates 5 through which the incident light is first transmitted. The light transmitter 3 is formed by laminating a plurality of transparent light-transmitting plates 5 composed of, for example, methyl methacrylate polymer, and by fixing the sides of the laminate by using an adhesive tape or an adhesive comprising methyl methacrylate, or through heat fusion. The light transmitter 3 as a whole is wedge shaped. One edge 5a of each transparent plate 5 is inclined at a predetermined angle α, with respect to the bottom of the plate 5. The other edge 5b of each plate 5 on which light is incident is inclined at an angle $\alpha_2$ smaller than the angle $\alpha_1$ of the edge 5a with respect to the bottom of the plate 5. In the light transmitter 3 shown in FIG. 1, the edge 5b of the plate 5 on which light is incident constitutes the plane of light incidence 1, and the edge 5a of the plate 5 through which light is emitted and the edge 5b of the plate 5 are perpendicular to each other.

As shown in FIG. 1, light rays 7 incident on the plane of light incidence 1 from the long light source 6, shown extending in a direction perpendicular to the drawing, such as a fluorescent light, are transmitted through the plates 5 in the direction shown by the arrow A while being reflected entirely within the plates without escaping outside the plates. These light rays 7 are then emitted through the edges 5a of the plates 5, and immediately thereafter, the emitted light rays are reflected by the light reflector 4 in the direction shown by the arrow B. The light rays 7 passing in a straight line through the plates 5 are reflected by the light reflector 4 in the direction shown by the arrow C. The light rays 7 reflected in the directions of the arrows B and C are transmitted through the light transmitter 3 across the plates 5 and then emitted through the plane of light emission 2. Thereafter, the emitted light rays irradiate a plane to be illuminated 8 of a liquid crystal or a display located outside the light diffuser.

The light diffuser shown in FIG. 1 has the following advantages:

Since the light transmitter 3 is composed of a laminate of a plurality of transparent plates 5 inclined downwardly and the light reflector 4 is provided at the light emission edge 5a of the plate 5, light rays 7 incident on the light transmitter 3 are transmitted through the plate 5 and emitted through the edges 5a, and the emitted light rays are subsequently reflected by the light reflector 4 in the directions shown by the arrows B and C. Finally, the reflected light rays irradiate the plane to be illuminated 8. Therefore, the brightness of the plane to be illuminated 8 becomes uniform throughout that plane.

Furthermore, since the light rays emitted from the light emission edge 5a of the plate 5 are reflected by the light reflector 4 in the directions shown by the arrows B and C, it is possible to make the distance between the light emission edge 5a and the plane to be illuminated 8 larger. This makes it possible to effectively prevent the boundaries between the plates 5 at the light emission edges 5a from appearing on the plane to be illuminated 8. Therefore, it is possible to obtain a plane illumination having an extremely uniform brightness as compared with the prior art.

Figure 2:
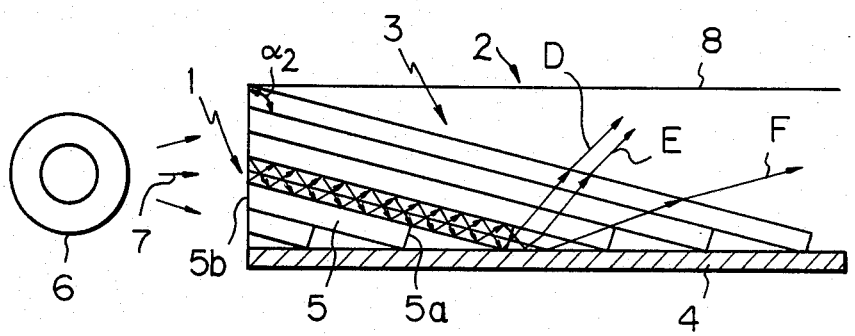
FIG. 2 is a cross-sectional view of another embodiment of a light diffuser of the present invention.

The light diffuser shown in FIG. 2 is different from the light diffuser shown in FIG. 1 in that the light emission plane of the light transmitter 3 is in the form of stairs comprising a plurality of edges 5a normal to the bottom of the plates 5. The light reflector 4 is provided in front of the light emission edge 5a.

When the light diffuser shown in the embodiment FIG. 2 is used, the light rays emitted from the light emission edges 5a are reflected by the light reflector 4 in the directions shown by the arrows D, E, and F. Therefore, it is possible to obtain plane illumination having an extremely uniform brightness in which the appearance of the boundaries between the plates 5 on the plane to be illuminated 8 is prevented, as in the light diffuser shown in FIG. 1. In addition, in the case of the light diffuser shown in FIG. 2, the light emission edges 5a are formed at right angles to the bottom of the plates 5. Therefore, when the light rays 7 are incident on the edges 5a after being transmitted through the plates 5, the angle of incidence is smaller than that of the light diffuser shown in FIG. 1, which results in a substantial elimination of the reflection of the incident rays 7 by the edges 5a. Accordingly, the light diffuser shown in FIG. 2 is advantageous in that the efficiency of light-transmission is extremely high.

Figure 3:
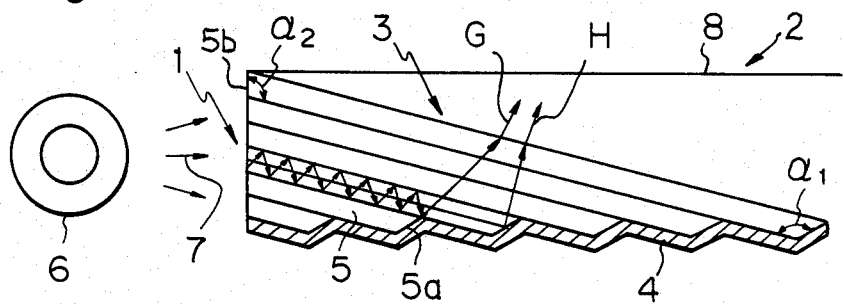
FIG. 3 is a cross-sectional view of a further embodiment of a light diffuser of the present invention.

In the light diffuser shown in FIG. 3, the light emission edge 5a of the plate 5 is inclined so that the angle $\alpha_1$ between the bottom of the plates 5 and the light emission edge 5a is not larger than the angle $\alpha_2$ between the bottom and the plane of light incidence 1 of the plate 5. In FIG. 3, both the angles $\alpha_1$ and $\alpha_2$ are designed to be 120°. In the light diffuser shown in FIG. 3, the light reflector 4 is brought into contact with the light emission edges 5a, and the edges 5a are in the form of stairs. In this regard, the light diffuser of FIG. 3 is different from those of FIGS. 1 and 2.

Figure 4:
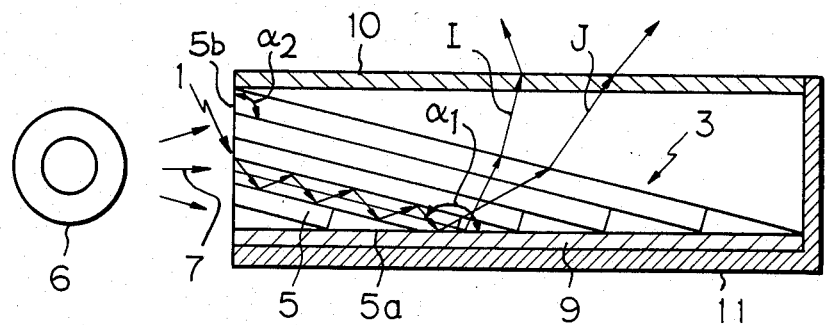
FIG. 4 is a cross-sectional view of a further embodiment of a light diffuser of the present invention.

In the light diffuser shown in FIG. 4, the light scattering reflector 9 is provided at the light emission edges 5a. Furthermore, the light transmitter 3 and the light diffusing plate 10 (composed of, e.g., a white opaque light transmitting material) are fixed to each other by the case 11, which also serves as a shield against the incidence of external light.

When the light diffuser shown in FIG. 4 is used, the light rays emitted from the light emission edges 5a are scattered and reflected by the light scattering reflector 9, so that light rays I and J, for example, are generated. These light rays are incident on the light diffusing plate 10 and are then further diffused. This diffusion makes it possible to obtain a plane illumination having an extremely uniform brightness in which the boundaries between the plates 5 on the plane to be illuminated are more effectively eliminated than in the light diffusers shown in FIGS. 1 to 3. In FIG. 4, the angles $\alpha_1$ and $\alpha_2$ are designed to be 130° and 100°, respectively.

Figure 5:
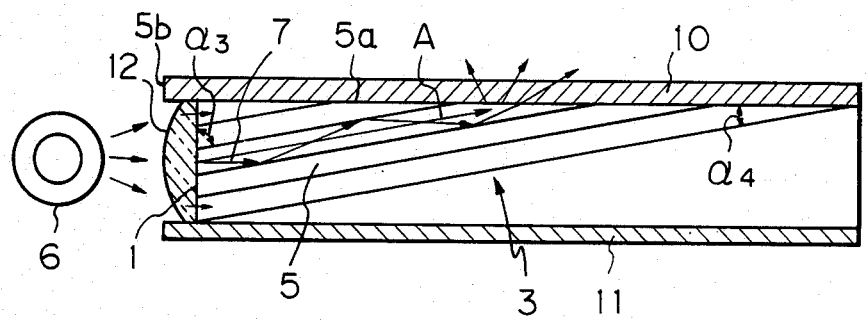
FIG. 5 is a cross-sectional view of a further embodiment of a light diffuser of the present invention.

In the light diffuser illustrated in FIG. 5, the flat convex cylindrical lens 12 made of a light-transmitting material is provided at the plane of light incidence 1 of the light transmitter 3 fixed to the case 11. Furthermore, the light diffusing plate 10 is provided at the light emission edges 5a.

The top surface of the light transmitter 3 shown in FIG. 5 is composed of the edges 5a of plates 5 each inclined at a predetermined angle $\alpha_4$ with respect to the bottom of the plate 5. The plane of light incidence 1 in the form of a rectangle is composed of the other edges 5b. The angle $\alpha_3$ between the edge 5b and the bottom of each plate 5 is larger than the angle $\alpha_4$ between the edge 5a and the bottom of each plate 5. Both the edges 5a and 5b are mirror-finished. Light rays incident on the light diffuser shown in FIG. 5 are transmitted through the plates 5 to the light emission edges 5a. In this light diffuser, the edge 5a and the edge 5b are perpendicular to each other, and thus the plane of light incidence 1 and the plane of light emission 2 are also perpendicular to each other.

In the light diffuser shown in FIG. 5, light rays 7 incident on the plane of light incidence 1 from the long light source 6, such as a fluorescent light, through the flat convex cylindrical lens 12 form condensed light rays 17 which are transmitted through the plates 5 in the direction shown by the arrow A while the light rays 7 are reflected entirely within the plates without escaping outside the plates. Thereafter, the light rays are emitted through the light emission edges 5a and are then diffused by the light diffusing plate 10.

The light diffuser shown in FIG. 5 has the following advantages.

Since the light diffusing plate 10 made of a white opaque light-transmitting material is provided at the light emission edges 5a, the light rays emitted from the edges 5a are diffused by this light diffusing plate 10. This permits elimination of the boundaries between the plates 5 on the plane to be illuminated. Therefore, it is possible to obtain plane illumination having an extremely uniform brightness on the plane to be illuminated. Furthermore, since the flat convex cylindrical lens 12 is provided at the plane of light incidence 1 of the light transmitter 3, light rays 7 radiated from the light source 6 are condensed to form light rays by this lens 12, which results in an increase in the quantity of light incident on the plates 5 and thus an increased efficiency of use of the light rays 7 from the light source 6.

Figure 6:
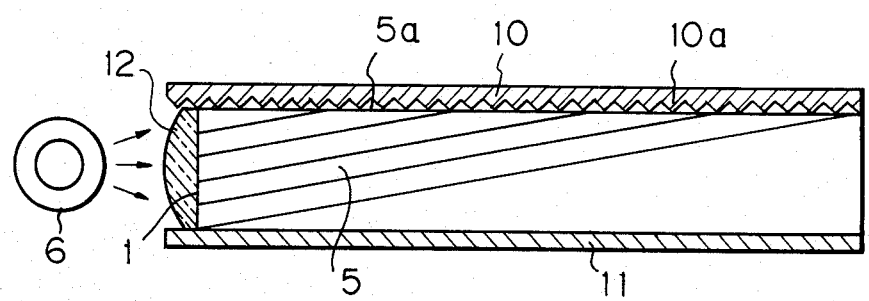
FIG. 6 is a cross-sectional view of a further embodiment of a light diffuser of the present invention.
Figure 7:
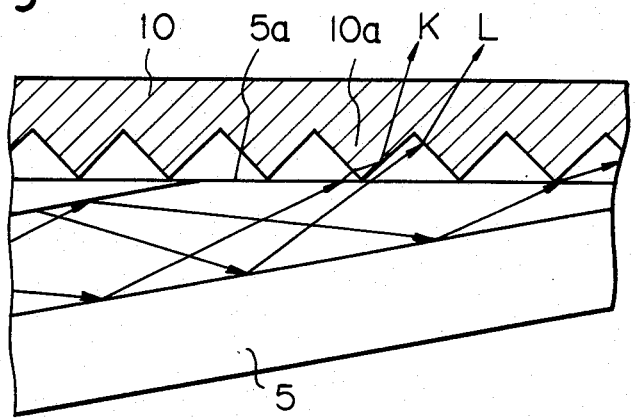
FIG. 7 is a cross-sectional view illustrating the vicinity of a protrusion provided in a light diffusing plate used in the light diffuser shown in FIG. 6.

In the light diffusers illustrated in FIGS. 6 and 7, a light diffusing plate 10 made of transparent methacrylic resin is used in place of the light diffusing plate 10 of FIG. 5. This light diffusing plate 10 is formed by extrusion. On one surface of the light diffusing plate 10, a plurality of protrusions 10a are provided having a triangular cross-sectional profile and extending at right angles to a direction along which the plates 5 are arranged (in a direction perpendicular to the drawing) and are equidistant from each other.

Since the light diffuser shown in FIGS. 6 and 7 includes the unique light diffusing plate 10 as mentioned above, it has the following advantages in addition to the advantages possessed by the light diffuser shown in FIG. 5.

The light rays, emitted from the light emission edges 5a, which are directed mainly along the central axis of an optical fiber (not shown) at the time of emission, are diffused by the protrusions 10a of the light diffusing plate 10 in a direction perpendicular to the light emission edges 5a. When the light rays emitted in various directions from the light emission edges 5a, after being transmitted through the plates 5, are incident on the light diffusing plate 10, light rays K and L are generated due to the prism and reflection effects of the protrusions 10a, as shown in FIG. 7. Thus, the light rays emitted from the light emission edges 5a can be effectively diffused in a direction perpendicular to the light emission edges 5a. This enables the brightness of the plane to be illuminated to be more uniform.

Figure 9:
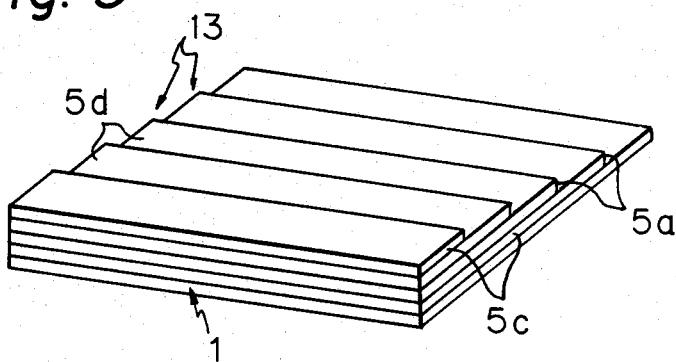
FIG. 9 is a perspective view of a light transmitting means used in the light diffuser shown in FIG. 8.

In the light diffusers illustrated in FIGS. 8 and 9, a plurality of plates 5 having a thickness of, e.g., 0.5 mm and made of methyl methacrylate polymer are arranged in layered form in such a manner that the light emission edges 5a of the plates 5 form steps 13. The plates 5 are fixed to each other by an adhesive (not shown) applied on both side edges 5c of the plates 5 or by heat fusion. The light emission edge 5a is perpendicular to the bottom of the plate 5 but the plane of light incidence 1 is inclined with respect to the bottom of the plate 5. Preferably, the light emission edges 5a and the plane of light incidence 1 are mirror-finished. The steps 13 are covered with the light diffusing plate 14. The light diffusing plate 14 is composed of trigonal prisms 15 arranged in the form of a plate. The light diffusing plate 14 is located in such a manner that the longitudinal direction of the prism 15 is parallel to the light emission edge 5a.

In the light diffuser illustrated in FIG. 8, the incident light rays parallel to the bottom of the plate 5 pass through the plate 5 and directly reach the light diffusing plate 14. The other incident light rays reach the light emission edge 5a while being reflected entirely within the plate 5 and are reflected by the surface 5d of the adjacent plate 5 and are then directed toward the light diffusing plate 14.

The light rays reaching the light diffusing plate 14 undergo reflection or refraction by the prisms 15 and are then emitted from the light diffusing plate 14.

In the case of the light diffuser shown in FIG. 8, when light rays are incident on the plane of incident light 1 in an equal quantity for each plate 5, the quantities of the light emitted from each light emission edge 5a located at a different distance from the incidence plane 1 are substantially equal to each other, with the result that plane illumination having a uniform illuminance can be obtained. If the steps 13 are arranged at a constant pitch, the quantities of light reaching the portion corresponding to each of the steps 13 are equal to each other, whereby plane illumination having a more uniform brightness can be obtained.

Also, in the light diffuser shown in FIG. 8, the light rays emitted from the light emission edge 5a tend to advance in a direction along the bottom of the plate 5. Since the steps 13 are covered with the light diffusing plate 14, however, the light rays emitted from the light emission edges 5a are diffused by the light diffusing plate 14, which makes it possible to obtain a plane illumination having a more uniform brightness.

The light diffuser illustrated in FIG. 8 can be fabricated by arranging a plurality of plates 5 in layered form so that the light emission edges 5a form the stairs 13 and by disposing the light diffusing plate 14 in such a manner that it covers the steps 13. Therefore, the light diffuser requires no special processing to be applied to the light transmitter 3, and it is easy to fabricate. Furthermore, in the light diffuser shown in FIG. 8, the plane of light incidence 1 is inclined with respect to the bottom of the plate 5. However, if the light diffuser is designed so that the plane of the light incidence 1 is perpendicular to the bottom of the plate 5 as shown by the chain line in FIG. 8, the light transmitter 3 can be made merely by arranging rectangular plates 5 in a layered form, which makes the fabrication of the light diffuser much easier.

In addition, if the plate 5 used has a reduced thickness, the illuminance of the plane illumination becomes more uniform.

Figure 10:
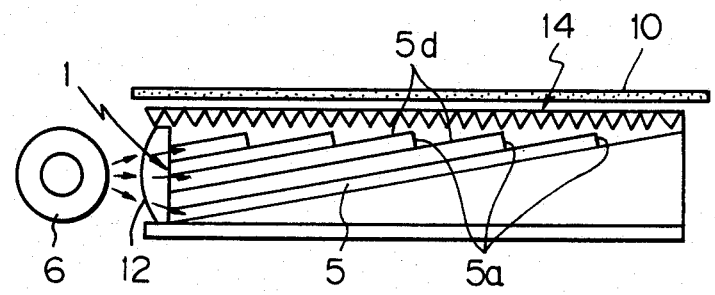
FIG. 10 is a cross-sectional view of a further embodiment of a light diffuser of the present invention.
Figure 11A:
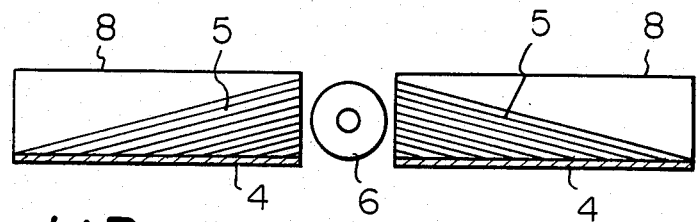
Figs. 11A to 11D are respectively explanatory views of a further embodiment of a light diffuser of the present invention.
Figure 11B:
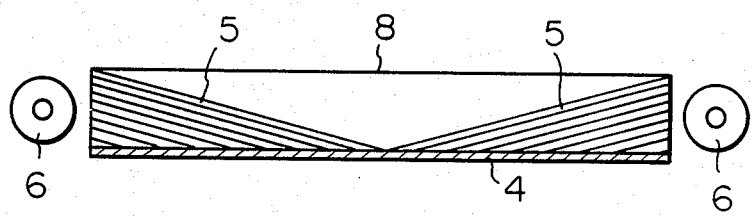
Figure 11C:
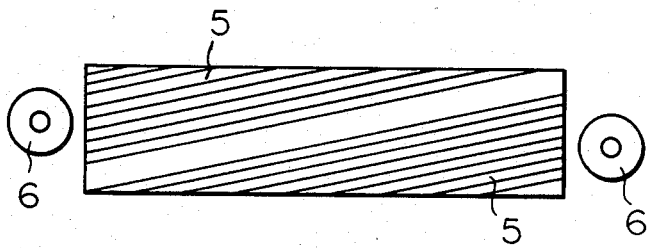
Figure 11D:
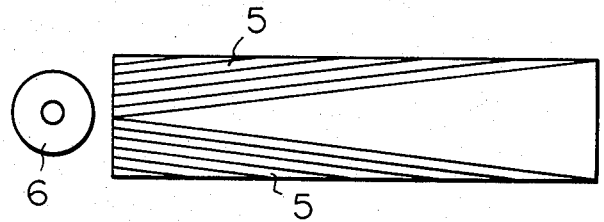

The light diffuser shown in FIG. 10 is identical with the light diffuser shown in FIG. 8 in structure, except that the white opaque light diffusing plate 10 is further provided over the light diffusing plate 14, and the plane of light incidence 1 is covered with the flat convex cylindrical lens 12. The use of such a light diffuser makes it possible to eliminate the boundaries between the light emission edge 5a and the top surface 5d of the plate 5 by the white opaque light diffusing plate 10 and thereby obtain a plane illumination having a more uniform brightness.

A polyester film having a mirror surface is desirably used as the light reflector 4. If necessary, a vapor-deposited film of metal, e.g., aluminum, may be used. The light reflector 4 may be provided in direct contact with the light emission edges 5a. Alternatively, a space may be formed between the light emission edges 5a and the light reflector 4. The surface of the light reflector 4 is preferably smooth, but the surface of the light reflector 4 may be sprayed with beads of methacrylic resins.

For example, the light reflector 4 shown in FIG. 2 may be provided in direct contact with the edge 5a of each plate 5 and a part of the bottom thereof as illustrated in FIG. 3. Similarly, the light reflector 4 shown in FIG. 3 may be provided so that a space is formed between the edge 5a of the plate 5 and the light reflector 4 as illustrated in FIG. 2.

The surface of the light reflector 4 may be roughened to scatter the light rays in order to form a reflector similar to the light scattering reflector 9 of FIG. 4.

The light emission edges 5a of the plates 5, whether the plates 5 are composed of resin plates 5 or optical fiber sheets 5, are of usually mirror-finished. If necessary, the light emission edge 5a may be processed into a roughened surface in the form of ground glass. If the light emission edge 5a is a roughened surface, the light rays emitted from the edge 5a may be diffused to a higher degree. This permits elimination of the appearance of the boundaries between the plate 5 on the plane to be illuminated 8 and thus a plane illumination having a more uniform brightness may be obtained.

Since the light transmitter 3 is composed of transparent resin plates 5, even if the distance between the plane of light incidence 1 and the light emission edge 5a is long, no substantial reduction occurs in the light quantity while the light rays are transmitted through the plates 5, with the result that a plane illumination having a uniform brightness can be obtained. If a material having a mirror surface is interposed between the plates 5 or a metallic film is formed on the surfaces of the plate 5 by, e.g., a vacuum deposition method, so as to make the surfaces mirror-smooth, it is possible to obtain a plane illumination having a more uniform brightness.

Similarly, if a layer made of a material having a low refractive index, such as water, adhesives and oligomers, is interposed between the plate 5, the efficiency of utilization of light incident on the light transmitter 3 can be increased. In this case, the processability of the light transmitter 3 also can be improved. If an adhesive is applied on the entire surface of the plates 5, the plates 5 can then be more tightly fixed to each other.

The angle between the plane of light incidence 1 and the light emission edge 5a, the angle between the plane of light incidence 1 and the bottom of the plate 5, and the angle between the light emission edge 5a and the bottom of the plate 5 may be optionally selected.

The plates 5 of the light transmitter 3 are preferably made of methacrylic resins comprising a homopolymer or copolymer of methyl methacrylate, although the use of the methacrylic resins is not critical. For example, polycarbonate resins also may be used as a material for the plate 5.

Various types of light-transmissible materials can be used for the light diffusing plate 10. Methyl methacrylate copolymers containing a light diffusing agent such as titanium oxide is preferably used. The methyl methacrylate copolymers used are preferably those polymers obtained by multi-stage polymerization, as disclosed in U.S. Pat. Nos. 3,804,925, 4,052,525, and 4,173,600 and U.S. patent application Ser. No. 526,546, filed Aug. 26, 1983.

The light diffusing plate 10 having a smooth surface at both sides thereof, as illustrated in FIGS. 6 and 7, may be used in combination with the light diffusing plate 10 as illustrated in FIGS. 6 or 8. The cross-sectional profile of the protrusions 10a of the light diffusing plate 10 shown in FIG. 6 and the prisms 15 of the light diffusing plate 14 shown in FIG. 8 and the spacing between these protrusions 10a or prisms 15 may be appropriately determined.

The condensing lens 12 used is preferably a flat convex cylindrical lens, though it is not limited thereto.

The light diffuser of the present invention may include a plurality of light transmitters 3 as illustrated in FIG. 11. FIGS. 11(a) and (b) illustrate light diffusers comprising a combination of two light transmitters 3 of the type shown in FIG. 2. FIGS. 11(c) and (d) illustrate light diffusers comprising a combination of two light transmitters 3 of the type shown in FIG. 5. The combination of the light transmitters 3 is not limited to the above-mentioned system. The light diffuser shown in FIG. 11 may also include the light diffusing plate 10.

In accordance with the light diffuser of the present invention, since light rays are transmitted from the plane of light incidence 1 to the light emission edge 5a through the light transmitter 3, it is possible to obtain a plane illumination having a more uniform illumination.

In accordance with one embodiment of the light diffuse of the present invention, since the light diffusing plate 10 is provided ahead of the light emission edge 5a of the light transmitter 3, it is possible to obtain a plane illumination having a more uniform brightness.

In accordance with another embodiment of the light diffuser of the present invention, since the condensing lens 12 is used a plane illumination having a high brightness is obtained.

In accordance with one mode of the light diffuser of the present invention, since the light reflector 4 is provided at the light emission edge 5a, the distance between the light emission edge 5a and the plane to be illuminated 8 can be made larger and, therefore, it is possible to obtain a plane illumination free from the boundaries between the plates 5 on the plane to be illuminated 8 and having an extremely excellent brightness as compared with the conventional prior art.

Furthermore, the light diffuser of the present invention is easy to fabricate, and thus can be commercially utilized.

The light diffuser of the present invention can be used as a backlight for displaying signboards, display devices, plane illumination for design, liquid crystals, and the like.

The following examples illustrate the specifics of the formation and the test results of some of the actually constructed samples formed in accordance with the present invention.

EXAMPLE 1

Four light diffusers as shown in FIG. 1 were fabricated using sheets of 110 mm width made of a methyl methacrylate polymer having various thicknesses. The thicknesses of the sheet of a diffuser were 0.2 mm, 0.5 mm, 1.0 mm or 2.0 mm. These sheets were cut and laminated so that the light emission edges 5a thereof formed steps 13. The cut surfaces of the laminate were polished so as to provide flat surfaces. In FIG. 1, the sheets were laminated so that $L_n$ was 110 mm and $L_0$ as 110 mm and $L_1$ was 11 mm.

A light reflector 4 was provided in contact with the light emission edges 5a. An aluminum-vapor-deposited polyester film having a thickness of 100 μm was used as the light reflector 4.

All the light diffusers comprising a combination of the laminate of the above-mentioned sheets and the light reflector 4 provided a plane illumination having a uniform brightness. Also, where the above-mentioned vapor-deposited film sprayed with beads of a methacrylate polymer was used as the reflective film, a plane illumination having a uniform brightness was obtained.

EXAMPLE 2

Four light diffusers as shown in FIG. 4 were fabricated using sheets of 110 mm width made of a methyl methacrylate polymer having various thicknesses. The thickness of the sheet of a diffuser were 0.2 mm, 0.5 mm, 1.0 mm or 2.0 mm. These sheets were cut and laminated so that the light emission edges 5a thereof formed stairs 13. The edges 5a for light incidence and emission of these sheets were mirror-finished. Fixation of the laminate was carried out by heat-fusing the sides of the sheets with each other.

An aluminum-vapor-deposited polyester film having a thickness of 100μ was used as the light reflector 4.

On the other hand, a white opaque methacrylic resin plate having a thickness of 2 mm was used as the light diffusing plate 10.

The case 11 was formed by subjecting an iron sheet of 0.2 mm thickness to sheet metal working.

The laminate of the methacrylator polymer sheet, the light diffusing plate 10, the light reflector 4, and the case 11 were assembled as shown in FIG. 4. The resultant light diffusers all provided a plane illumination having an extremely uniform brightness.

Figure 12:
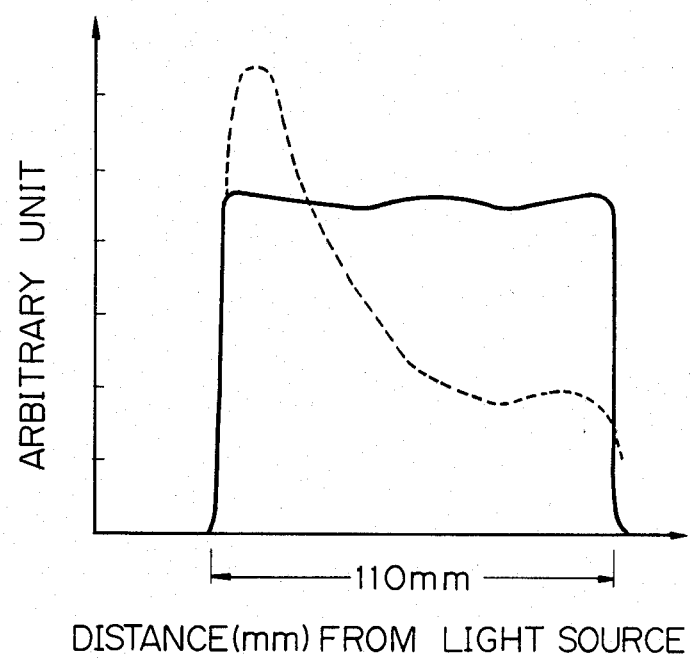
FIG. 12 is a graph illustrating the properties of the light diffuser of the present invention.

FIG. 12 illustrates the illuminance distribution of one embodiment of a light diffuser having the structure shown in Example 2. The light transmitter 3 of this light diffuser is made by laminating 16 methyl methacrylate polymer sheets 110 mm wide by 1 mm thick so that $L_0$ is 110 and $L_1$ is 16 mm. In FIG. 12, the ordinate represents the illuminance and the abscissa represents the distance from the light source. The solid line indicates the illuminance distribution according to this example (a 1 mm thick sheet is used), and the dotted line indicates the illuminance distribution of a light diffuser which was produced according to the same procedures as mentioned above, except that a piece of methyl methacrylate polymer sheet having a thickness of 16 mm was used in place of the light transmitter 3 of this example. It is apparent from FIG. 12 that the light diffuser of the present invention provides a uniform luminance distribution.

EXAMPLE 3

Four light diffusers shown in FIG. 10 were fabricated in the same manner as in Example 2. Four types of methyl methacrylate polymer sheets having thicknesses of 0.2 mm, 0.5 mm, 1.0 mm, and 2.0 mm were used as the light-transmissable plate 5.

The first light diffusing plate 14 was provided above and adjacent to the light emission edges 5a of the plates 5. The light diffusing plate 14 was a transparent sheet of a methacrylic resin on one surface of which prisms 15 were formed parallel to each other at a pitch of 0.7 mm. This transparent sheet was made by extrusion.

A white opaque methacrylic resin sheet (2 mm thick) was used as the other light diffusing plate 10.

A semicylindrical lens having a width ($L_1$) of incidence plane of 11 mm and made of a methacrylic resin was used as the condensing lens 12.

The case 11 was formed by subjecting an iron sheet of 0.2 mm thickness to sheet metal working.

The laminate of the methyl methacrylate polymer sheets 5, the light diffusing plates 14 and 10, the condensing lens 12, and the case 11 were assembled as shown in FIG. 10. The resultant light diffusers all provided a plane illumination having a uniform brightness.

Obviously, numerous modifications and variations of the present invention are possible in light of the above teachings. It is therefore to be understood that, within the scope of the appended claims, the invention may be practiced otherwise than as specifically described herein.

We claim:

1. An edge lighting type light diffuser comprising:
   (a) a plane of light incidence;
   (b) light transmitting means which, in use, receive light rays from said plane of light incidence;
   (c) a plane of light emission through which the light rays are emitted; and
   (d) means for reflecting the light rays transmitted through said light transmitting means,
   (e) said light transmitting means comprising a plurality of light-transmitting plates having planar surfaces superimposed on each other, each one of said plurality of light-transmitting plates having:
     (i) a first edge against which light is incident during use of the diffuser, said first edges collectively comprising said plane of light incidence, and
     (ii) a second edge normal to the surfaces of said light transmitting plates, said second edges being spaced from each other to form a staircase structure, each of said second edges being inclined relative to said plane of light incidence, and
   (f) said means for reflecting the light rays being located in linear contact with said second edges of said light transmitting plates.

2. A light diffuser as claimed in claim 1, wherein each one of said plurality of light-transmitting plates is inclined at an angle of more than 90° and less than 135° measured clockwise therefrom to said plane of light incidence.

3. A light diffuser as claimed in claim 1, wherein said plurality of light-transmitting plates are formed of a methacrylic resin.

4. A light diffuser as claimed in claim 1, wherein said means for reflecting the light rays comprises a metal-deposited film.

5. A light diffuser as claimed in claim 1, wherein said means for reflecting the light rays comprises a polyester film having a mirror surface.

6. A light diffuser as claimed in claim 1, wherein said means for reflecting the light rays has a smooth surface.

7. A light diffuser as claimed in claim 1 wherein said second edges of said plurality of light-transmitting plates are inclined from said plane of light incidence at a first predetermined angle and from said plane of light emission at a second predetermined angle.

8. A light diffuser as claimed in claim 7, wherein said first predetermined angle is less than 135°.

9. A light diffuser as claimed in claim 7, wherein said first predetermined angle is less than 45°.

10. A light diffuser as claimed in claim 1, and further comprising a light diffusion means for diffusing the reflected light rays, said light diffusion means being provided opposite to said means for reflecting the light rays.

11. A light diffuser as claimed in claim 10, wherein said light diffusing means has a plurality of small protrusions on a surface thereof facing said light transmitting means.

12. A light diffuser as claimed in claim 10, wherein said light diffusing means is formed of a white opaque light-transmitting material.

13. A light diffuser as claimed in claim 12, wherein said white opaque light-transmitting material is an acrylic resin film containing a light diffusing agent.

14. A light diffuser as claimed in claim 12, wherein said white opaque light-transmitting material is an acrylic polymer film containing a light diffusing agent.

* * * * *